US005743656A
United States Patent [19]
Gomyo et al.

[11] Patent Number: 5,743,656
[45] Date of Patent: Apr. 28, 1998

[54] HYDRODYNAMIC BEARING APPARATUS AND METHOD FOR MANUFACTURING SAME

[75] Inventors: Masato Gomyo; Tamotsu Nose; Masamichi Hayakawa, all of Nagano, Japan

[73] Assignee: Sankyo Seiki Mfg. Co. Ltd., Nagano-ken, Japan

[21] Appl. No.: 702,012

[22] Filed: Aug. 26, 1996

[30] Foreign Application Priority Data

| Aug. 26, 1995 | [JP] | Japan | 7-240683 |
| Sep. 4, 1995 | [JP] | Japan | 7-250209 |
| Feb. 9, 1996 | [JP] | Japan | 8-048089 |

[51] Int. Cl.$^6$ ........................ F16C 33/74
[52] U.S. Cl. ........................ 384/124; 384/123
[58] Field of Search ........................ 384/123, 124, 384/112, 113, 107, 121

[56] References Cited

U.S. PATENT DOCUMENTS

| 5,357,163 | 10/1994 | Minakuchi et al. | 384/123 |
| 5,427,456 | 6/1995 | Hensel | 384/123 |
| 5,487,608 | 1/1996 | Leuthold et al. | 384/123 |

*Primary Examiner*—Lenard A. Footland
*Attorney, Agent, or Firm*—McAulay Fisher Nissen Goldberg & Kiel, LLP

[57] ABSTRACT

A hydrodynamic bearing apparatus comprises at least two hydrodynamic bearing units which rotatably support a rotation member against a fixed member by hydrodynamic pressure of a lubricant filled in a bearing space. A thrust plate is adhesively bonded on one of the rotation member and fixed member to support the rotation member in an axial direction. The thrust plate and rotation member or fixed member form a junction. A mechanical bonding device bonds the thrust plate onto one of the rotation member and fixed member. A sealing agent prevents the lubricant from leaking from the junction between the thrust plate and the rotation member or fixed member. The sealing agent fills a space that communicates with the junction.

8 Claims, 10 Drawing Sheets

HYDRODYNAMIC BEARING APPARATUS AND METHOD FOR MANUFACTURING SAME

BACKGROUND OF THE INVENTION a) Field of the Invention

This invention relates to a hydrodynamic bearing apparatus configured to generate a hydrodynamic pressure in the lubricant interposed between the fixed member and rotation member and to rotatably support the rotation member against the fixed member.

DESCRIPTION OF THE RELATED ART

Recently, in various apparatus such as a motor, various hydrodynamic bearing apparatus using hydrodynamic pressure of the lubricant such as an oil has been studied and proposed to meet specifically high performance spin. In this hydrodynamic bearing apparatus, the hydrodynamic pressure surfaces on the side of the fixed member and on the side of the rotation member face each other, and a groove for generating a hydrodynamic pressure is formed on at least one side of the two hydrodynamic pressure surfaces; a predetermined amount of the lubricant such as an oil interposed between the rotation member and fixed member is pressured up by pumping action of the groove for generating a hydrodynamic pressure when the rotation member spins, then the rotation of the rotation member is supported by the hydrodynamic pressure of the lubricant.

In such hydrodynamic bearing apparatus, there are a hydrodynamic radial bearing for supporting the rotation member in the radial direction and a hydrodynamic thrust bearing for supporting the rotation member in the thrust direction.

In the hydrodynamic thrust bearing, as illustrated in FIG. 16, one end of a rotation shaft 111 having grooves for generating hydrodynamic pressure is arranged opposite the thrust plate 113; a hydrodynamic pressure is generated by means of lubricant between the rotation shaft 111 and the thrust plate 113 to bear in the axial direction, that is, in the thrust direction. Currently, the thrust plate 113 is normally bonded on the side of the fixed member 114 such as a frame, to maintain perpendicularity of the mount surface 115 with respect to the rotation shaft 111; an adhesive 116 which also works as a sealing agent is used for bonding the thrust plate 113 to the side of the fixed member 114. This hydrodynamic bearing apparatus is configured such that a communication hole 118 is formed on the thrust plate 113 for releasing the air in the bearing to the outside during assembly; and a drain 117 for holding lubricant is formed on the fixed member 114 so that the overflowed lubricant from the bearing unit during assembly is held therein.

In the above mentioned conventional hydrodynamic bearing apparatus, the communication hole 118 is formed on the thrust plate 113 so that the radial bearing surface and thrust bearing surface communicate with each other; and the holding drain 117 is formed on the fixed member 114. The communication hole 118 is filled with the adhesive 116 and is supposed to be closed; however, it is not completely closed by simply filling the adhesive 116 in actual operation, and a space that allows the lubricant to invade remains. If the communication hole 118 remains as a space into which the lubricant invades, the lubricant moves into this space, thus reducing the amount of the lubricant at the hydrodynamic bearing surface. The shortage of the lubricant burns out the bearing surface.

In addition, the lubricant holding drain 117 formed on the fixed member 114 is attached to the mount surface 115 formed on the side of fixed member 114 such as a frame. In reality, the junction surface may also contain a minute space; if the minute space communicates with the holding drain 117, the holding drain 117 provides a space into which the lubricant enters, thus causing the problem in that the amount of the lubricant is reduced.

OBJECT AND SUMMARY OF THE INVENTION

This invention aims to provide a hydrodynamic bearing apparatus wherein the amount of the lubricant injected in the bearing unit is not caused to be excessive or short at the junction on which the thrust member for hydrodynamic pressure support in the thrust direction, that is, the thrust plate is mounted, and excellent bearing property is obtained.

In accordance with the invention, a hydrodynamic bearing apparatus comprises at least two hydrodynamic bearing units which rotatably support a rotation member against a fixed member by hydrodynamic pressure of a lubricant filled in a bearing space. A thrust plate is adhesively bonded on one of the rotation member and fixed member to support the rotation member in an axial direction. The thrust plate and rotation member or fixed member form a junction. Mechanical bonding means bond the thrust plate onto one of the rotation member and fixed member. A sealing agent prevents the lubricant from leaking from the junction between the thrust plate and the rotation member or fixed member. The sealing agent fills a space that communicates with the junction.

DESCRIPTION OF THE PREFERRED EMBODIMENTS

Embodiments of this invention that are applied to the type of HDD spindle motor in which the journal is fixed at both ends are described in detail referring to drawings herein.

Figure 1:
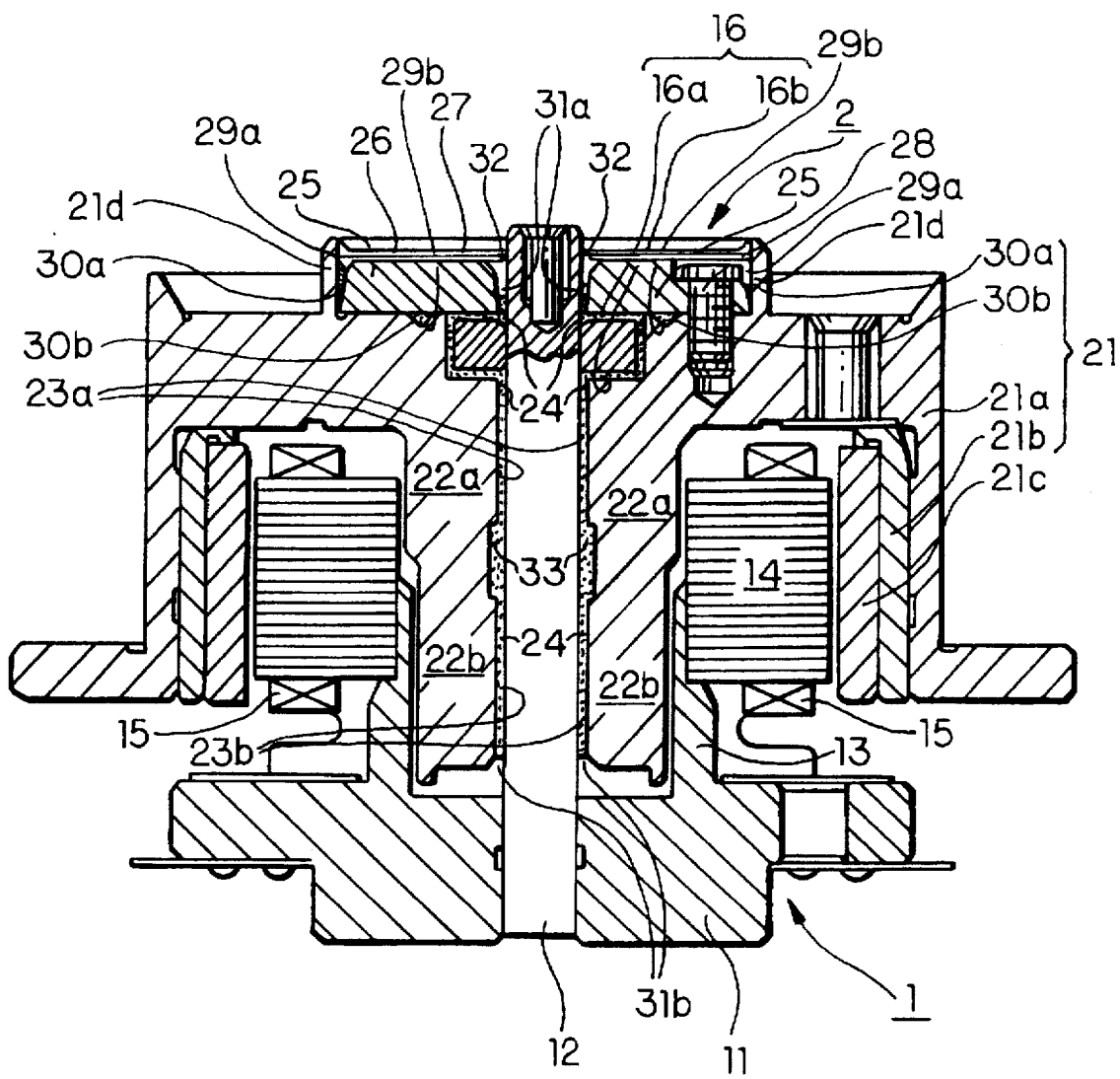
FIG. 1 is a side cross sectional view of an example of an HDD spindle motor employing a hydrodynamic bearing of the first embodiment of this invention.
Figure 2:
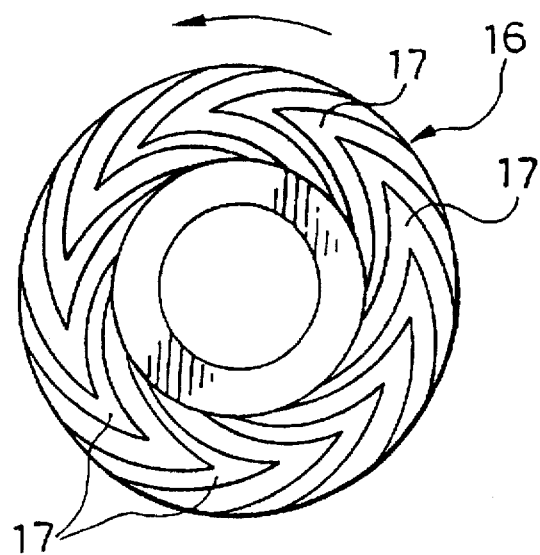
FIG. 2 is a plan view of an example of grooves for generating a thrust hydrodynamic pressure.

Regarding the overall structure of the HDD spindle motor illustrated in FIG. 1, the HDD spindle motor is constructed with a stator assembly 1, which is a fixed member, and a rotor assembly 2, which is a rotation member mounted on the stator assembly from the top in the figure. The stator assembly 1 comprises a frame 11 screwed on the side of a fixed base, which is not illustrated, and a journal 12 secured onto the center of the frame 11, pointing upward in the figure. The tip of the journal 12 (the top in the figure) is screwed into the fixed base, which is not illustrated, so that both ends of the journal 12 are secured onto the base. The frame 11 has a cylindrical hollow support holder 13; a stator core 14 is engaged with the outer circle of the support holder 13; a coil 15 is wound around the salient-pole of the stator core 14.

On the other hand, the rotor assembly 2 has a hub 21 for supporting a predetermined recording medium, for example, a hard disk, which is not illustrated; the hub 21 is rotatably supported on the side of the outer circle of the journal 12 by a pair of hydrodynamic radial bearing units 22a and 22b arranged at its center. The hub 21 has a cylindrical body 21a which secures a magnetic recording medium such as magnetic disk on the outer circle; on the side of the inner circle of the body 21a, a driving magnet 21c is annularly secured via a back yoke 21b. The driving magnet 21c is arranged closely annularly opposed with respect to end surface of the outer circle of the stator core 14.

The pair of hydrodynamic radial bearing units 22a and 22b are formed integral with the hub 21 on the inner circle of the hub 21, being apart in the axial direction at a predetermined distance. The surface of the inner circle of each hydrodynamic radial bearing units 22a and 22b and the surface of the outer circle of the journal 12 are arranged opposite each other at a distance of several µm. At least at one side of the surfaces of each hydrodynamic radial bearing units 22a and 22b, and the journal 12, the herringbone-shaped grooves for generating a hydrodynamic radial pressure are formed annularly in parallel in the concavity; a predetermined amount of lubricant 24 consists of oil, magnetic fluid, or the like; when the hub 21 rotates, the lubricant 24 is pumped up by the pumping action of the groove for generating a hydrodynamic radial pressure and a hydrodynamic pressure is generated; the hub 21 is supported by the journal in the radial direction thereby.

In this embodiment, the oil used for the lubricant 24, for providing the bearing a long usable life time and good properties at the same time, has a structure obtained by esterifying trimethylalpropane (TMP) or pentaerythritol (PE) and normal or iso-fatty acid having 5 to 18 carbon atoms. Oil specifically having an evaporation ratio of $10^{-7}$ g/h·cm$^2$ or less (at 40° C.) and a viscosity of 30 cP or less (at 40° C.) is used. Note that in order to inject the lubricant 24 within the bearing, an assembled motor is placed in vacuum temporarily, and capillary force or external atmospheric pressure under vacuum is used. In this way, the lubricant 24 entirely covers the inside of the bearing so that it contain little air.

In addition, at the tip of the journal 12 (the top in the figure), an annular ring plate 16 constituting two hydrodynamic thrust bearing units 16a and 16b is attached. The hydrodynamic thrust bearing units 16a and 16b, constructed with this ring plate 16, are arranged adjacent to the hydrodynamic radial bearing unit 22a illustrated at the top in the figure. That is, the bottom of the ring plate 16 is arranged opposite the end of hydrodynamic radial bearing unit 22a illustrated at the tip (the top in the figure); the top of the ring plate 16 is arranged opposite the bottom of the thrust plate 25 which constitutes a bearing screwed into the center of the hub 21; at both ends, along the axial direction, of the ring plate 16 which constitutes the hydrodynamic thrust bearing unites 16a and 16b, herringbone-shaped grooves 17 for generating hydrodynamic thrust pressure are formed annularly. In addition, in the gap between opposing surfaces of the ring plate 16 and the hydrodynamic radial bearing unit 22a and in the gap between the opposing surfaces of the ring plate 16 and the thrust plate 25, the lubricant 24 on the side of the hydrodynamic radial bearing units 22a and 22b is filled without interruption; when the hub 21 rotates, the lubricant 24 is pumped up by the pumping action of the grooves 17 to transmit hydrodynamic thrust via the lubricant 24 hydrodynamically; the hydrodynamic pressure generated by the lubricant 24 supports the hub 21 in the thrust direction by the journal.

When the thrust plate 25 is joined with the top of the hub 21 in this way, a continuous bearing space extended in the axial direction is formed; in this bearing space, the above four hydrodynamic bearing units 16a, 16b, 22a and 22b are arranged in the axial direction and the lubricant 24 is filled in the bearing space as well.

The hub 21 and thrust plate 25 are tightened with a screw 28 such that the mount surface extending from the bearing space to the outside is formed; at a point of the surface of the junction between the two members 21 and 25, extending from the bearing space to the outside, an adhesive 29a and 29b is applied to two places to seal the two members 21 and 25. The adhesive 29a and 29b is filled in each of the capillary guide means 30a and 30b formed on the outer circle of the junction in the radial direction and at a point of the junction surface; through these capillary guide means 30a and 30b, the adhesive 29a and 29b is guided without interruption throughout the peripheries of the junction by capillary action to form a complete sealing structure.

The capillary guide means 30a formed on the outer circle of the junction in the radial direction is formed of a narrow gap between a tapered wall formed by machining the outer circle of the thrust plate 25 and the inner circle wall of the annular flange 21d which is formed like a thin plate on the upper side of the hub 21 as illustrated. This narrow gap is formed so that it outwardly extends (upper level in the figure) whose dimension measured at the outermost end is 0.3 mm or less, and it has the function of delivering the adhesive 29a to the entire peripheries of the junction by capillary force.

In addition, the other capillary guide means 30b at a point of the junction surface in the radial direction is formed of an annular groove, having a V-shaped cross section in the concavity of the upper surface of the hub 21 constituting the junction surface. This annular groove also has a predetermined shallow depth so that it has the same capillary force. The annular groove delivers the adhesive 29b without interruption to the entire peripheries of the junction.

Furthermore, the narrow gap and annular groove constituting these capillary guide means 30a and 30b are constructed such that they open to the outside of the apparatus (the upper level in figures) during assembly. Therefore, the adhesives 29a and 29b may be directly injected from the outside.

Note that the thrust plate 25 is attached to the hub 21 after assembly is completed for each of the hydrodynamic bearing units described above. However, the bearing space, that is, the junction surface facing the filling area of the lubricant 24 is this thrust plate 25 only; other portions rather than the filling area of the lubricant 24 are formed integral, thus the sealability is excellently maintained. Also, the junction surface between the thrust plate 25 and the hub 21 are attached together by the adhesive used for 29a and 29b mentioned above before injecting the lubricant 24, to obtain a perfect sealing. This also assists the excellent sealability for the lubricant 24.

On the other hand, a thin-plate like stopper plate 27 is formed on the thrust plate 25 mentioned above via an absorbent cloth 26 from the outside (the upper side in figures.) This absorbent cloth 26 and the stopper plate 27 as well, in the worse case scenario, prevents the lubricant 24 from dispersing to the outside.

As described above, the two hydrodynamic radial bearing units 22a and 22b and the two hydrodynamic thrust bearing units 16a and 16b are formed in a continuous bearing space extending in the axial direction. However, at both ends of the bearing space, including these four hydrodynamic bearing units 16a, 16b, 22a, and 22b in the axial direction, the two capillary seals 31a and 31 b which are constituted by narrowing the gaps between the journal 12 and the hydrodynamic bearing unit 22b that is a member of the rotation side, and between the journal 12 and the thrust plate 25, are formed, sandwiching the four hydrodynamic bearing units 16a, 16b, 22a, and 22b between the both ends of the journal in the axial direction.

Between each of the capillary seals 31a and 31b, the lower capillary seal 31b is formed on a part of the hydrodynamic bearing unit 22b by creating a tapered narrow section between the inner circle wall at the axial outer end of the hydrodynamic radial bearing 22b at the axial outer end of the hydrodynamic radial bearing 22b and the outer peripheries of the journal 12. The tapered narrow gap constituting the capillary seal 31b directly communicates with the gap constituting the bearing unit of the hydrodynamic radial bearing unit 22b; and at the communicating section between the capillary seal 31b and the hydrodynamic radial bearing unit 22b a concavity is not formed which widens the gap.

Figure 3:
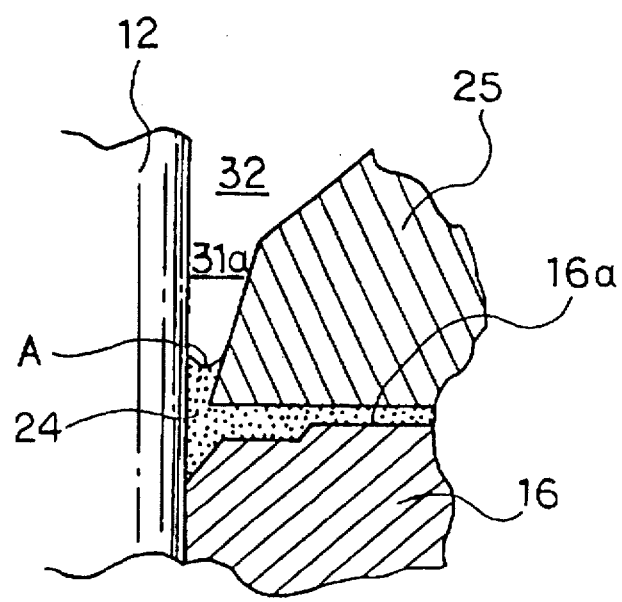
FIG. 3 is an enlarged partial view of the side cross sectional view illustrating the structure of the upper capillary seal.

On the other hand, the upper capillary seal 31a is formed of, as illustrated in FIG. 3, a tapered gap between the thrust plate 25 constituting the hydrodynamic thrust bearing unit 16a and the journal 12, by creating the tapered narrow gap between the inner peripheries of the thrust plate 25 and the outer surface of the journal 12.

Each of both the upper and lower capillary seals 31a and 31b is formed along the axial direction such that the tapered narrow gap constituting the capillary seals 31a and 31b opens outwardly illustrated at the top and bottom in the figure. Each of the inner peripheries of the thrust plate 25 and the inner peripheries of the hydrodynamic bearing unit 22b, illustrated at the bottom in the figure, facing the journal 12 to form the narrow gaps for each capillary seals 31 and 31b, are formed by a tapered wall continuously widening the gap outwardly in the axial direction; the continuously enlarging capillary seals 31a and 31b use the portion where the dimension of the tapered narrow gap is from 20 μm to 300 μm. In addition, the outer portions of each of these capillary seals 31a and 31b is coated with oil repellent agent to prevent shortage of the lubricant 24 by diffusing to the outside.

As described above, the lubricant 24 fills without interruption the bearing space between the two capillary seals 31a and 31b including the four hydrodynamic bearing units 16a, 16b, 22a, and 22b. The position for each liquid surface of the lubricant 24 at the top and bottom in the figure is predetermined to be the internal position of each of the capillary seals 31a and 31b, as the position of the capillary seal 31a is shown by the solid line A in FIG. 3.

Returning to FIG. 1, the lubricant inlet 32 is formed continuously in the axial direction with respect to the capillary seal 31a axially outside of this upper capillary seal 31a (upper side of the figure.) This lubricant inlet 32 is formed by a widening gap continuous to the narrow gap constituting the capillary seal 31a; the inner peripheries of the thrust plate 25 facing the journal 12 is tapered at a larger angle than the tapered wall constituting the capillary seal 31a. The tapered wall constituting the lubricant inlet 32 has an angle smaller than 70° such that the lubricant 24 permeates well in the axial direction; the gap at the outermost end of the lubricant inlet 32 in the axial direction is set to be 400 μm or more. The gap capacity of the lubricant inlet 32 is set to be larger than that of the bearing space which connects the two capillary seals 31a and 31 b; with this structure, the entire lubricant 24 can be temporarily injected into the lubricant inlet 32 and is guided to the inside (lower side in the figure) by capillary action, that is, capillary force until the lubricant 24 fills throughout the bearing space when it is exposed to atmospheric pressure.

In addition, a lubricant reservoir 33 is formed between the hydrodynamic radial bearing units 22a and 22b by depressing the inner peripheries so as to enlarge the gap formed by the journal 12. The dimension for the lubricant reservoir 33 of this embodiment is set to be larger than that of the gap of the hydrodynamic radial bearing units 22a and 22b by three times or more, or 40 μm or more. This is done to prolong the usable life time of the bearing by supplying the lubricant 24 of the predetermined level or more to the lubricant reservoir 33 so that the lubricant 24 can be supplied to the bearing unit with some allowance. At this time, if the pressure of the lubricant 24 in the lubricant reservoir 33 is maintained slightly higher than atmospheric pressure by causing the axial-oriented pumping action using an axially asymmetric groove pattern for generating hydrodynamic pressure, the influence from air may be small even if some air is left in the lubricant 24.

According to the above embodiment, the position of the liquid surface for the lubricant 24 exists in the capillary seals 31a and 31b comprising the narrow gap between the journal 25 and the members 25 and 22b on the rotation side; the capillary sealing force works all the time, not only when the journal rotates, but also when it stops; the lubricant 24 is held at an internal predetermined position using the drawing force based on the capillary sealing force. On the other hand, when a large inertia is added, a hydrodynamic pressure due to the viscous resistance of the lubricant 24 occurs at the capillary seals 31a and 31b from the narrow gap; the hydrodynamic pressure obtained from the viscous resistance of the lubricant 24 mainly holds the lubricant, preventing its dispersion to the outside. Also, the simple configuration using tapered surface for the capillary seals 31a and 31b of this invention makes its manufacture easier, thus improving productivity.

Moreover, on the junction surface between the hub 21 and the thrust plate 25 working as bearing constituting members that form the bearing space, the apparatus is configured such that capillary force from the capillary guide means 30a and 30b guides the; adhesive 29a and 29b that seals these thrust plate 25 and the hub 21 along the entire peripheries of the junction, thus preventing the lubricant from diffusing to the outside.

The first embodiment of this invention is described above. Needless to say, the first embodiment can be modified without departing from the essence of the invention.

Figure 4A:
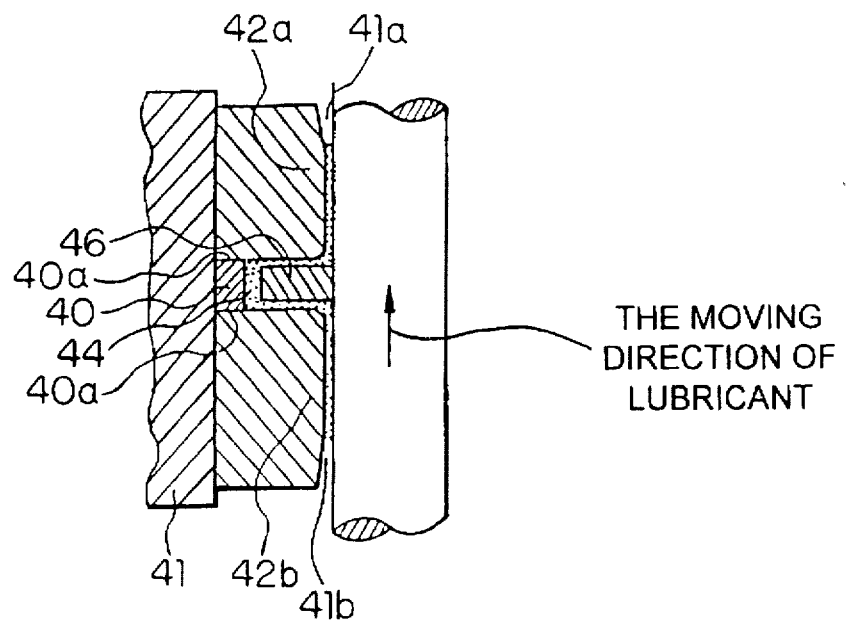
FIG. 4 is a diagrammatic half side cross sectional view illustrating the alternate positioning of a hydrodynamic bearing unit.
Figure 4B:
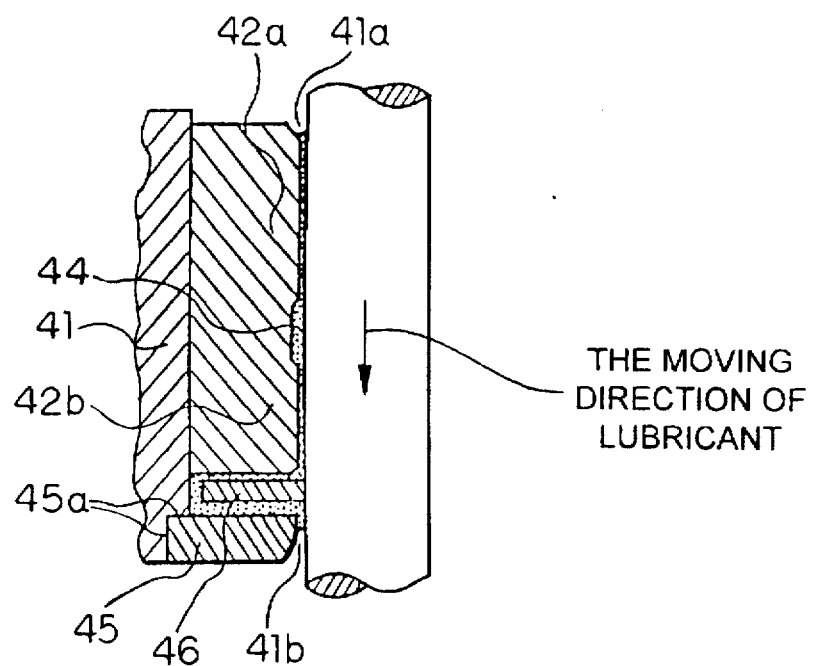

For example, as illustrated in FIG. 4(a), a ring plate 46 constituting a hydrodynamic thrust bearing unit may be arranged between the two hydrodynamic radial bearing units 42a and 42b in the axial direction, or as illustrated in FIG. 4(b), it may be arranged adjacent to the lower hydrodynamic radial bearing 42b which is the opposite of the one described above in the first embodiment (FIG. 1).

In FIG. 4(a), a spacer 40 forms a bearing space between the two hydrodynamic radial bearing units 42a and 42b; a capillary guide means comprising grooves or narrow gaps may be formed on the junction surfaces 40a and 40b between the hydrodynamic radial bearing units 42a and 42b and the spacer; an adhesive for sealing the both members 42a and 40 may be filled in the capillary guide means. In this example, the two hydrodynamic radial bearing units 42a and 42b work as the thrust plate as well. In addition, in FIG. 4(b), the ring plate 46 is arranged at the bottom surface in the figure, which is the opposite of the embodiment illustrated in FIG. 1; the bottom of the ring plate 46 in the figure is arranged opposite the end (the top in the figure) of the thrust plate 45 which constitutes the bearing. A capillary guide means may be created by grooves or narrow gaps on the junction surface 45a between the ring plate 46 and the hub 41, and an adhesive for sealing the both members 45 and 41 is filled in the capillary guide means. In these embodiments illustrated in FIGS. 4(a) and (b), the adhesive is guided to the entire peripheries without interruption by each capillary guide means, providing a perfect sealing structure.

Figure 5:
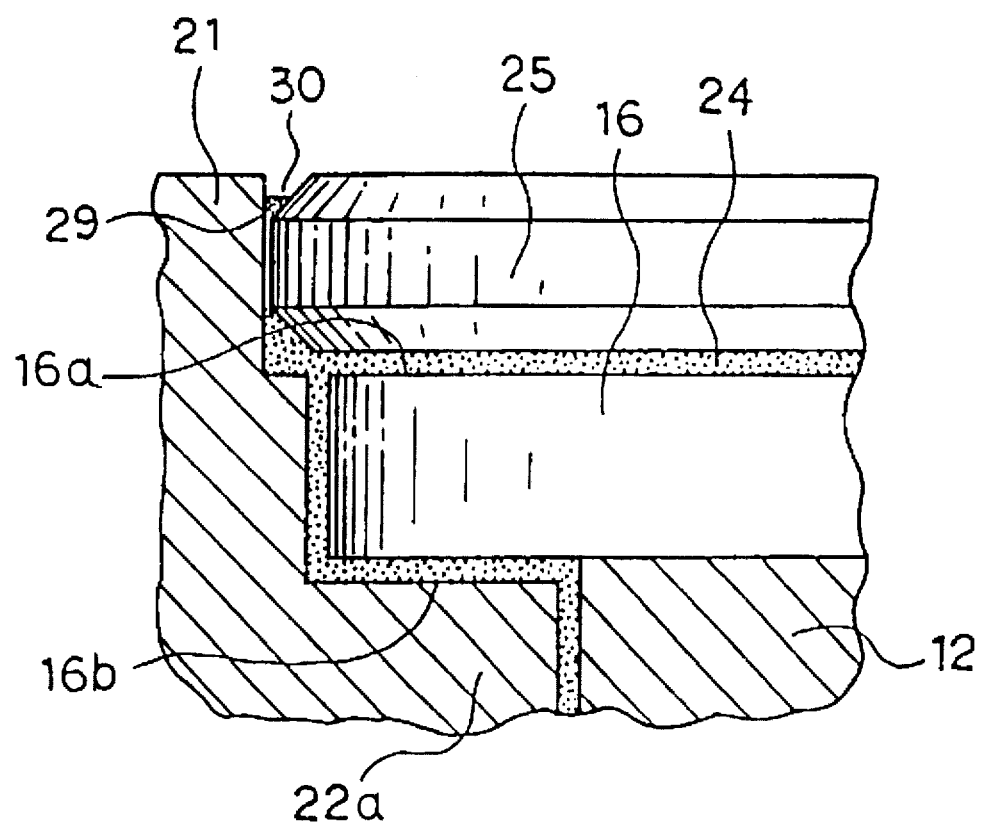
FIG. 5 is an enlarged side cross sectional view of a major unit of an upper portion of the motor of an alternative embodiment of this invention.

In the embodiment illustrated in FIG. 5, the outer circle of the thrust plate 25 is sealed to the hub 21, a capillary guide means 30 constituted by groove or narrow gap is formed at the junction surface to be sealed, and an adhesive 29 is filled in the capillary guide means 30 for sealing both members 25 and 21. This embodiment provides the same operation and effects as described in the above embodiment.

In the capillary guide means of this invention, it is possible to improve the operation and effects described above by forming a plurality of grooves or narrow gaps. In addition, the capillary guide means is not limited to the annular grooves or narrow gaps described above but a variety of means may be used as long as it has the capillary force. Moreover, the grooves for generating hydrodynamic pressure derived from this invention are not limited to the ones in the herringbone-shape in the above mentioned embodiment, but any grooves for generating hydrodynamic pressure may be applied.

In addition, the embodiment described above is applied to a motor whose journal is fixed; however, it may be applied to the motor whose journal is rotary; the grooves for generating hydrodynamic pressure may be not limited to formation in the radial bearing unit, but may beformed in the hydrodynamic thrust bearing unit, or on both. Furthermore, this invention may be applied to hydrodynamic bearing apparatus used for other than a HDD motor as mentioned above.

Figure 6:
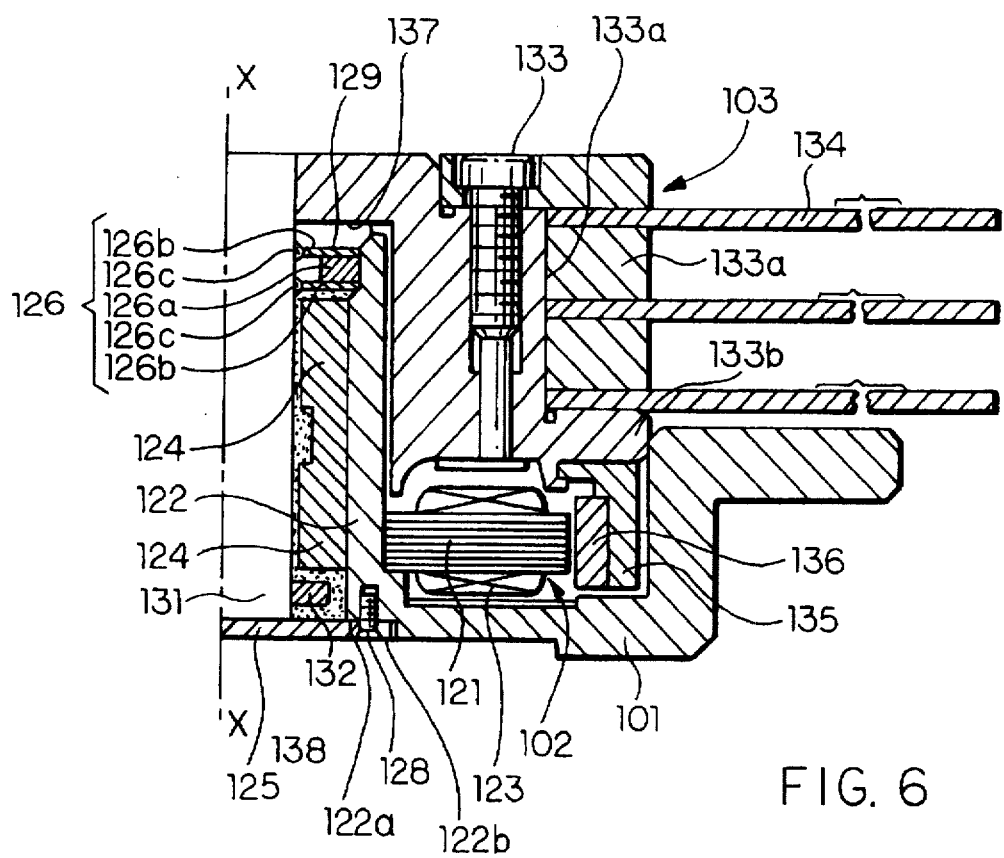
FIG. 6 is a cross section of an HDD spindle motor using the hydrodynamic bearing apparatus of the second embodiment of this invention.

Next, the second embodiment of this invention is described. FIG. 6 illustrates the right half of the HDD spindle motor of the second embodiment, cutting with the X—X center axis for rotation, which is mainly constructed with a stator assembly 102 fixed on the side of the frame 101 and a rotor assembly 103 covered from the top over the stator assembly 102. The stator assembly 102 is constructed with a stator core 121 fit to the outer circle of a cylindrical bearing holder 122 standing at the center of the frame 101 and a core 123 wound around the salient-pole of said stator core 121.

On the inner circle of the bearing holder 122, a pair of radial sliding bearings 124 and 124 are formed at a predetermined distance in the axial direction; a rotation shaft 131 is rotatably supported by the pair of radial sliding bearings 124 and 124. That is, the inner circle surfaces of the two radial sliding bearings 124 and 124 provide slippery contact with the outer circle surface of the rotation shaft 131 via a predetermined lubricant; because the grooves for generating hydrodynamic pressure exist either on the inner circle surface of the bearing 124 or on the outer circle surface of the rotation shaft 131, a hydrodynamic lubrication surface is constructed in the radial direction, with the inner circle surface of each of the radial sliding bearing 124 and the outer circle surface of the rotation shaft 131.

Figure 7:
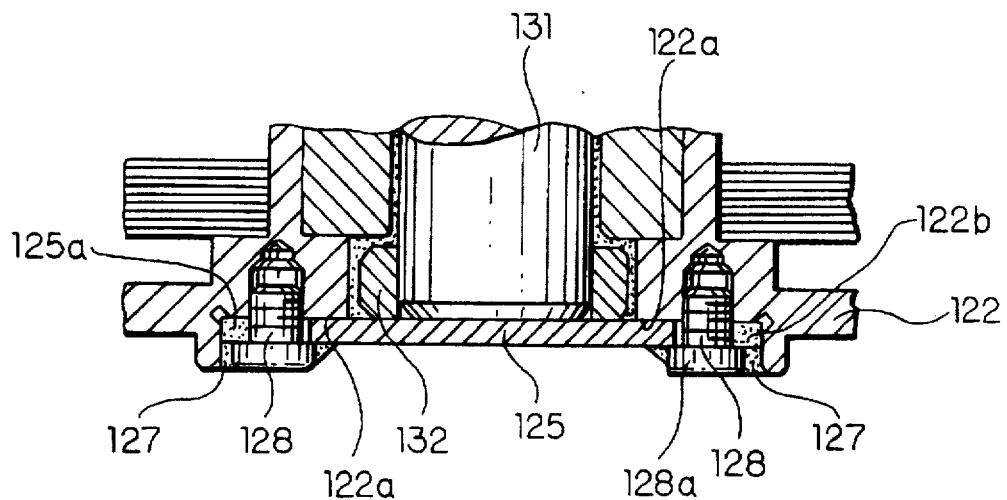
FIG. 7 is a cross section of the major section of the hydrodynamic bearing apparatus applied in embodiments of this invention.
Figure 8:
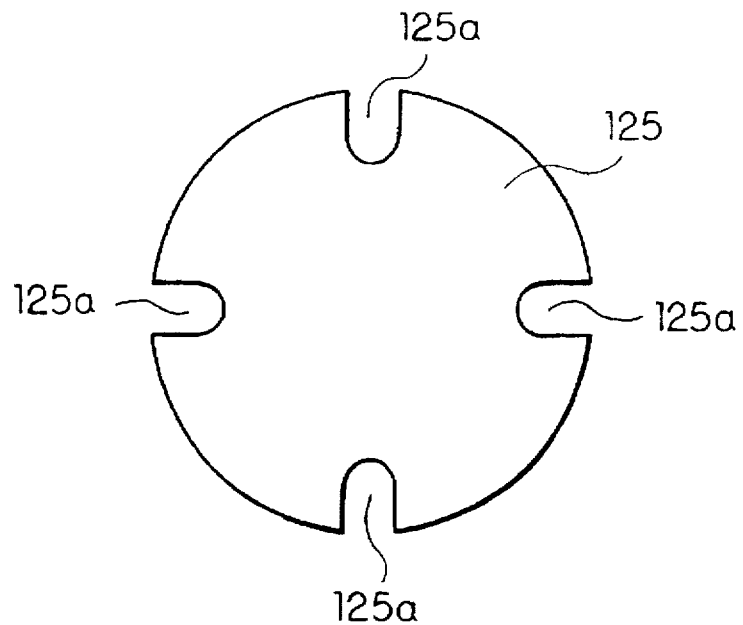
FIG. 8 is a plan view of a thrust plate of the hydrodynamic bearing apparatus illustrated in FIG. 7.

In addition, on top of (the bottom in the figure) the rotation shaft 131, the grooves for generating a hydrodynamic pressure are formed to generate a hydrodynamic pressure in the thrust direction; the top of the rotation shaft 131 slippery abrasively contacts a thrust plate 25 covering the opening at the bottom of the bearing holder 122; the hydrodynamic lubrication surface in the thrust direction is constructed with the top of the rotation shaft 131 and the holding surface of the thrust plate 125; on top of the rotation shaft 131, the flange like stopper is attached for preventing the rotation shaft 131 from escaping. As illustrated in FIG. 7, the thrust plate 125 is sealed to the junction surface 122a formed like a step at the end of the opening of the bearing holder 122 at a predetermined preciseness. Also, as illustrated in FIG. 8 at the outer circle edge of the thrust plate 125, a plurality of U-shaped screw holes 125a are formed as notches open toward the outside. A screw 128, which is a mechanical bonding means, is screwed to the side of the bearing holder 122 through the U-shaped screw hole 125a, firmly attaching the thrust plate 125 to the bearing holder 122. As such, by abutting the thrust plate 125 to the mount surface 122a of the bearing holder 122, it is positioned precisely perpendicular to the rotation shaft 131.

Outside the junction surface between the thrust plate 125 and the bearing holder 122, that is, the mount surface 122a formed on the frame 101, an adhesive 127 as a sealing material is filled to coat the peripheries of the heads 128a of the screws 128, thus bonding and sealing that section. Forming the U-shaped screw holes 125a on the thrust plate 125 lets the adhesive 127 surely enter the screw holes 125a because a part of the screw holes 125a has a diameter larger than that of the head 128a of the screw 128, thus eliminating the chance for the screw hole being left as the space which may be invaded by the bearing lubricant. In addition, it ensures bonding and sealing between the thrust plate 125 and the bearing holder 122, that is, the mount surface 122a formed on the frame 101. Epoxies, acrylic resin, phenol resins, etc. are used for the adhesive 127.

Note that the thrust plate 125 is formed in a size that perfectly fits the wall surface 122b on the frame side with is formed like steps at the opening edge of the bearing holder 122; however, if the thrust plate 125 is made in a size not to touch the wall surface 122b so that a space is created between the wall 122b throughout peripheries, the adhesive 127 is surely filled between the outermost end of the outer circle of the thrust plate 125 and the wall 122b on the frame 101. In this way, a space which allows the bearing lubricant invades between the outermost end of the outer circle of the thrust plate 125 and the wall 122b on the frame 101 is not formed, thus making sure bonding and sealing therebetween.

As described, filing the adhesive 127 into the U-shaped screw hole 125a, etc. after fixing the thrust plate 125 on the mount surface 122a on the side of the bearing holder 122 by means of a screw 128, which is a mechanical bonding means, allows the adhesive 127 to enter, by capillary action, the small gap left in the junction between the attached thrust plate 125 and the mount surface 122a, thus improving sealing performance and adhesion strength without affecting the thrust plate 125 being perpendicular to the rotation shaft 131. Even if the adhesive does not enter therebetween by capillary action and a small gap is left in the junction between the thrust plate 125 and the mount surface 122a, thus allowing the bearing lubricant to invade therebetween, the gap is so small that it will not adversely affect the lubricants bearing properties.

Figure 9:
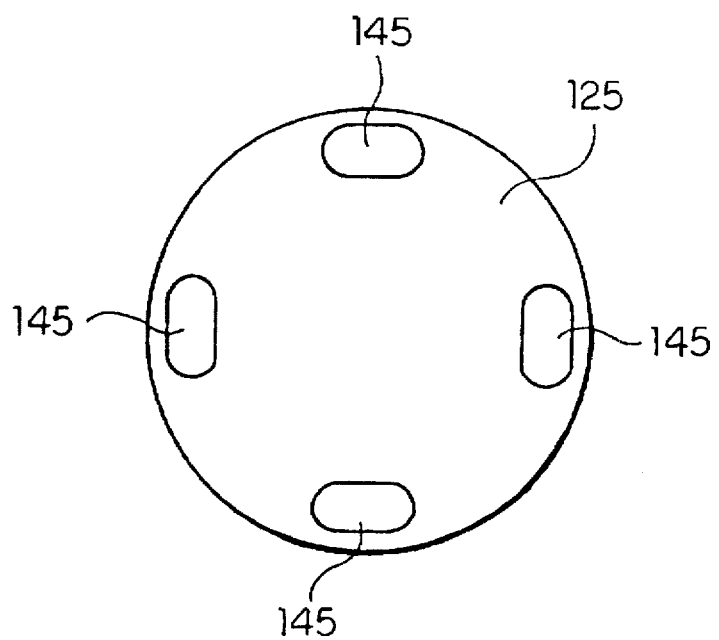
FIG. 9 is a plan view of an example of an alternate thrust plate.

The above embodiment uses the configuration of fitting a U-shaped screw hole 125a to a screw 128, however, an elongated hole 145 formed along the circular direction, as illustrated in FIG. 9, may be used instead. Such elongated holes 145 used for screw holes on the thrust plate 125 provides the structure in that the screw holes on both sides of the head 128 of a screw in not be a space for lubricant invasion so that the lubricant is released outside. As a result, the sealing agent filled in the peripheries of the aforementioned screw 128 is filled into the screw hole well.

Returning to FIG. 6, on the outer edge in the axial direction of the rotation shaft 131 (top in the figure), a hub 133 constituting the rotor assembly 103 is integrally fixed so that it may rotate. The hub 133 comprises a cylindrical body 133a attaching a plurality of magnetic disks 134 on its outer circle, a mount 133b at the bottom of the body 133a, and an annular driving magnet 136 on the mount 133b via a back yoke 135. The driving magnet 136 is arranged in the vicinity of and opposite the salient-pole of the stator core 121.

Also, at the opening on the upper side of the bearing holder 122, a magnetic fluid seal 126 is arranged to prevent the overflow of the magnetic fluid which is a lubricant. This magnetic fluid seal 126 has a magnet 126a annularly attached on the inner wall of the bearing holder 122; at both ends of this annular magnet 126a in the axial direction, a pair of pole pieces 126b are attached. Between the edge of the inner circle of each pole piece 126b and the outer circle surface of the rotation shaft 131, a magnetic fluid 126c is held so that a sealing function is provided by means of this magnetic fluid 126c. At this time the pole piece 126b axially outside (upper side in the figure) of the magnetic fluid seal 126 is arranged opposite in the axial direction with respect to the bottom of the hub 133 and the facing surfaces between the pole piece 126b and the hub 133 are coated with oil repellent layers 129 and 137 made of Teflon, for example.

Next, the spindle motor assembly is described referring to the drawings.

Figure 10:
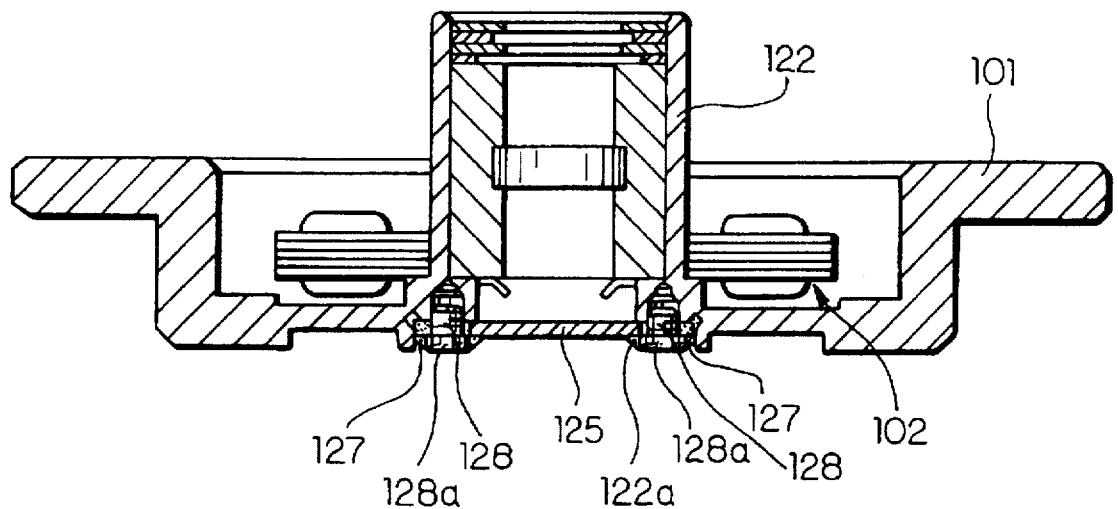
FIG. 10 is a descriptive assembly diagram for the hydrodynamic bearing apparatus of FIG. 6, and also is a cross section of the frame on which a stator assembly is mounted.

In FIG. 10, code 101 shows the frame installed with a stator assembly 102 of the hydrodynamic bearing apparatus of this invention, and a bearing holder 122 is formed integral with the frame 101. After attaching the thrust plate 125 to the junction surface 122a formed on the bearing holder 122 and fixing the thrust plate 125 on the bearing holder using screws 128a, adhesive 127 is filled in the peripherals of the heads 128a of the screws 128 via the screw holes 125a and dried.

Figure 11:
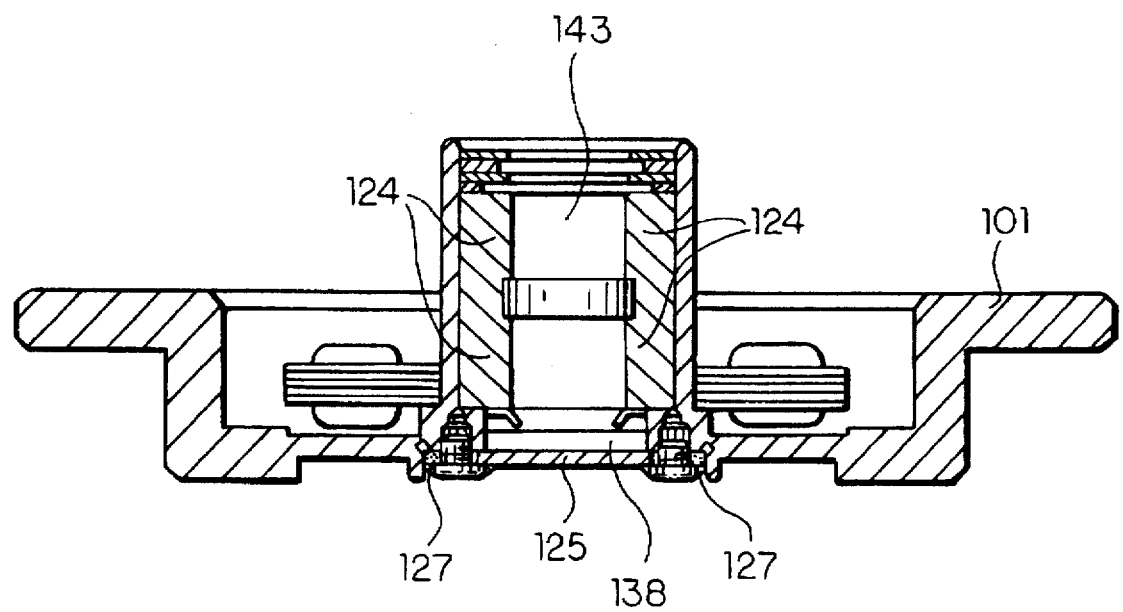
FIG. 11 is a descriptive assembly diagram for the hydrodynamic bearing apparatus of FIG. 6, and also is a cross section showing the frame on which a stator assembly is mounted and a lubricant fluid is filled therein.

After curing the adhesive 127, as illustrated in FIG. 11, the lubricant 138, which is a magnetic fluid, is injected into the inside the hydrodynamic bearing from the upper opening while vacuuming the void 143 inside the hydrodynamic bearing. The lubricant 138 is injected after the adhesive 127 is cured; therefore, the lubricant 138 and the adhesive 127 hardly react with each other, preventing the lubricant 138 from reacting with the adhesive 127 and leaking from the portion sealed with the adhesive 127. As a result, little lubricant 138 in the void 143 decreases, maintaining a predetermined quantity.

Figure 12:
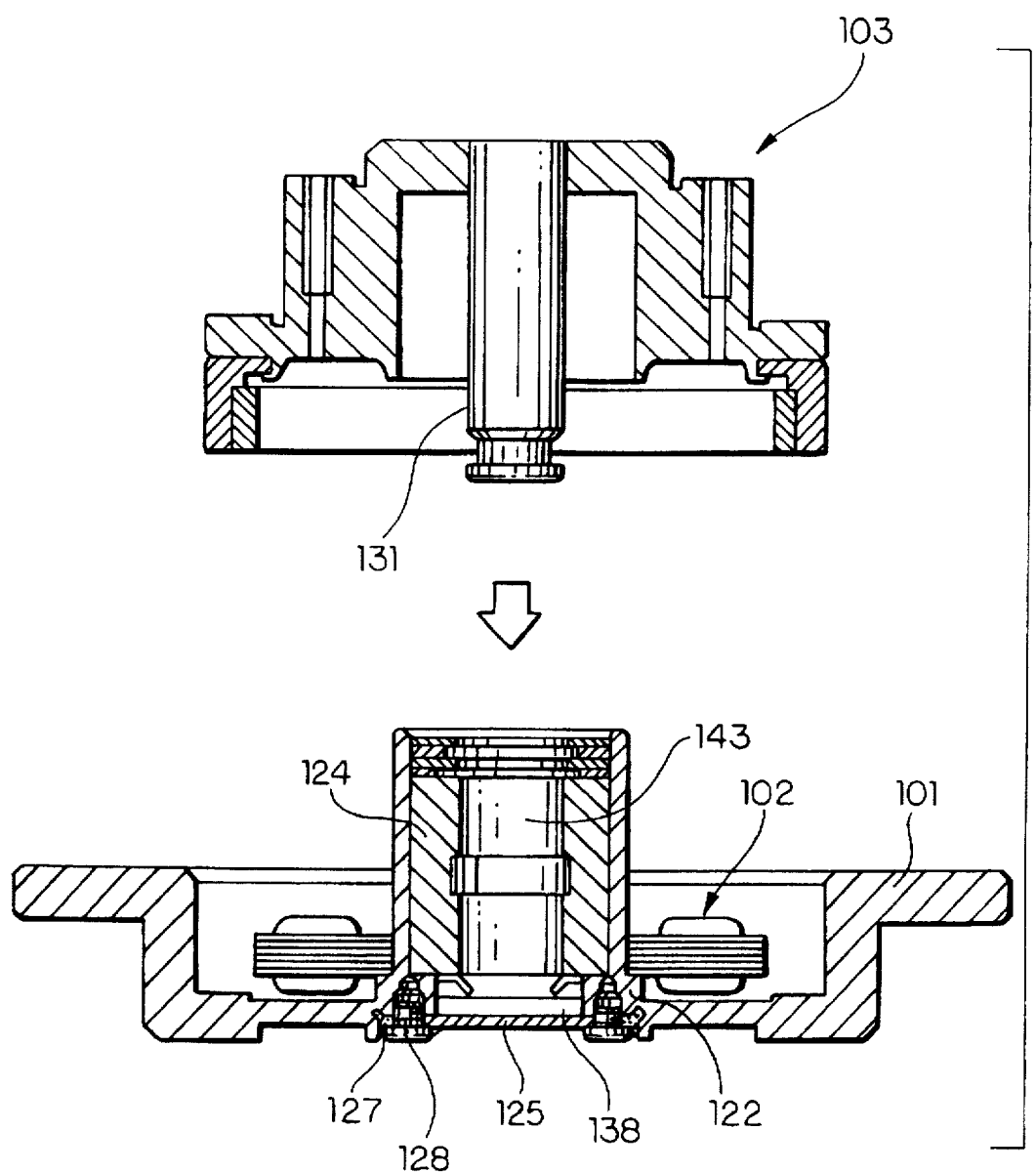
FIG. 12 is a descriptive assembly for the hydrodynamic bearing apparatus of FIG. 6 on which a stator assembly is mounted to show how a rotor assembly assembled in layers is inserted.
Figure 13:
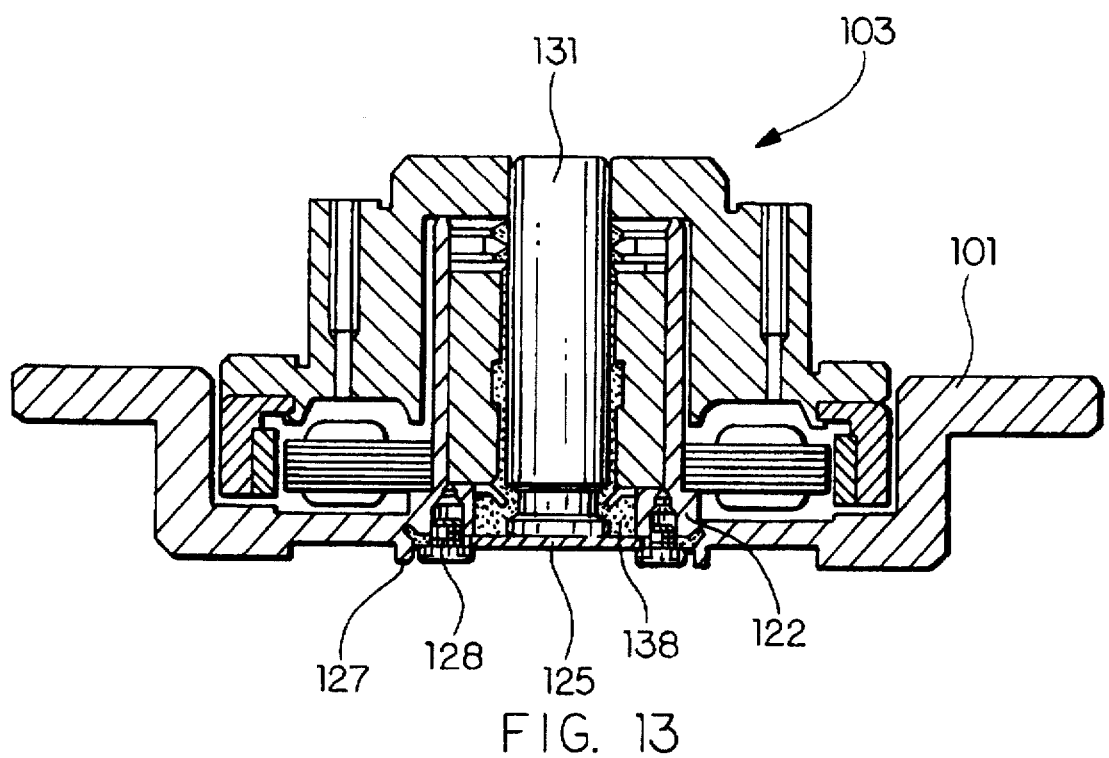
FIG. 13 is a cross section of the assembled hydrodynamic bearing apparatus of FIG. 12.
Figure 16:
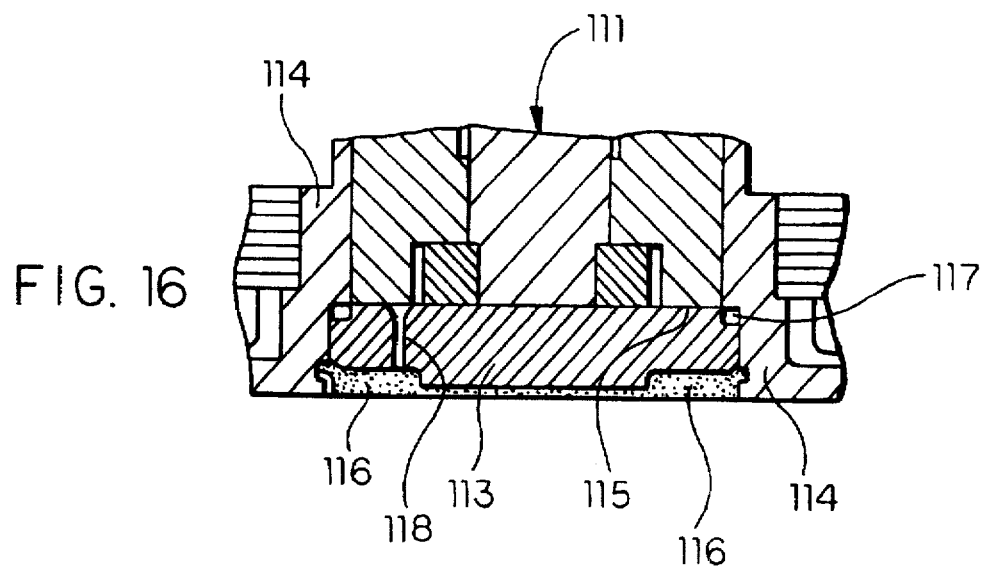
FIG. 16 is a cross sectional view of the major section of a conventional hydrodynamic bearing apparatus.

Next, as illustrated in FIG. 12, a rotor 103, which is a rotation member, is assembled under vacuum from the top of the frame 101 installed with a stator assembly 102, and the rotation shaft 131 of the rotor assembly 103 is inserted so that it is rotatably supported by the radial bearing unit 124. In this way, the lubricant 138 permeates throughout the outer circle surface and the bottom surface of the rotation shaft 131, thus enabling the generation of hydrodynamic pressure in the radial bearing and the thrust bearing.

Configuring the hydrodynamic bearing apparatus as described enables the thrust plate 125 to be excellently perpendicular to the rotation shaft 131, and prevents the lubricant from leaking outside the bearing apparatus. That is, in the embodiment described above, the screws 128, which are a mechanical bonding means to fix the thrust plate 125, works as a fixed member and abuts the thrust plate 125 such that the thrust plate 125 is firmly attached to the junction surface 122a of the bearing holder 122, thus preventing the lubricant from leaking to the outside and providing an excellent perpendicularity to the thrust plate 125 to the junction surface 122a. With the adhesive 127 used as a fixing means and as a sealing agent between the thrust plate 125 and the bearing holder 122, that is, along the peripheries of the heads 128a of the screws 128, the bonding strength of the thrust plate 125 increases.

Figure 14:
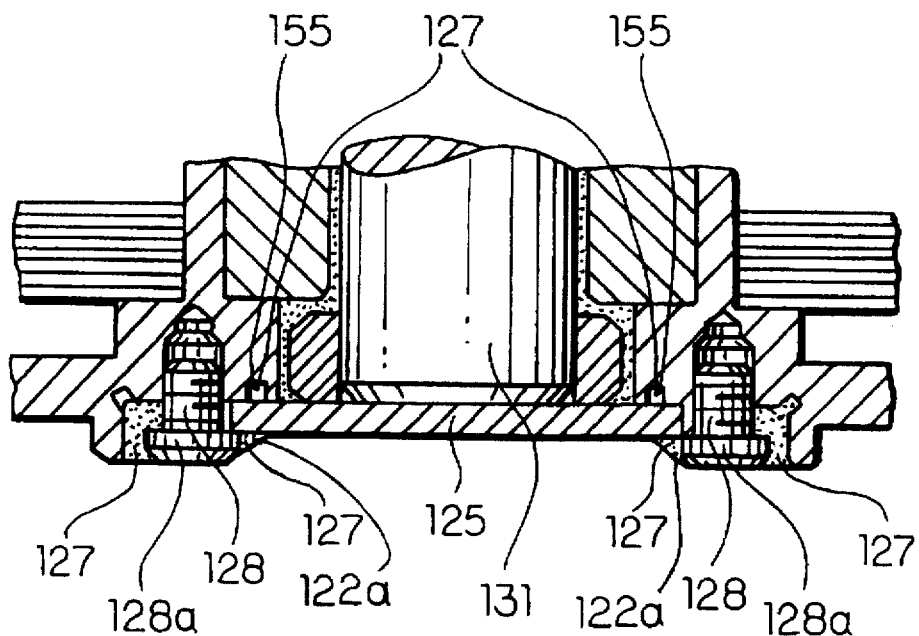
FIG. 14 is a cross sectional view of the major section of the hydrodynamic bearing apparatus of alternate embodiment.

In this specific embodiment, there is no space to which the lubricant may invade inside the junction surface 122a of the bearing holder 122. Therefore, even if the lubricant 138 filled in the hydrodynamic bearing unit tries to enter the junction surface 122a between the thrust plate 125 and the bearing holder 122, there is no independent space for storage, so no lubricant can escape from the hydrodynamic bearing side. Even if any lubricant does escape, the amount will be minimal. Therefore, the amount of the lubricant kept inside the hydrodynamic bearing remains as predetermined. In addition, as illustrated in FIG. 14, when there is a space 155 such as the adhesive reservoir groove into which the lubricant invades, inside the junction surface 122a between the bearing holder 122 and the thrust plate 125, this independent space 155 may be filled in advance with the adhesive 127 so that it loses its functionality as a space. This prevents the lubricant filled inside the hydrodynamic bearing from overflowing from inside the hydrodynamic bearing unit to stay in the independent space while the amount of the lubricant which tends to overflow from inside the hydrodynamic bearing unit is minimized.

Figure 15:
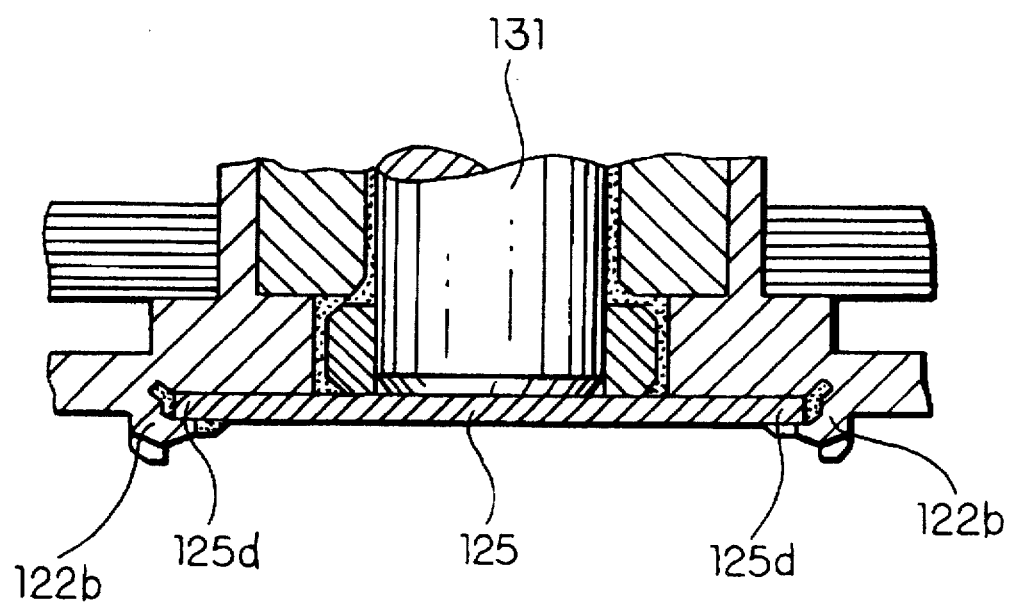
FIG. 15 is a cross sectional view of the major section of the hydrodynamic bearing apparatus of another alternate embodiment.

In the above embodiment, screws are used as a mechanical bonding means. As illustrated in FIG. 15, however, the mechanical bonding means may be configured by caulking the bent section 122b formed on the end of the junction outer circle of the bearing holder 122 to the end of the outer circle 125d of the thrust plate 125.

Also, the above embodiment is applied to the motor with a fixed shaft; however, it can be applied to the motor with a rotary shaft. The area for forming grooves for generating hydrodynamic pressure using generated pressure differential is not limited to the radial bearing unit, but the grooves can be formed in the thrust hydrodynamic bearing unit or both. Furthermore, this invention may be applied to those hydrodynamic bearing apparatus used for other than HDD motors described above.

The configuration of this invention uses a sealing agent so as not to form an independent space that allows the lubricant to invade the mount section between a thrust plate and a rotation member or a fixed member. It prevents the chance of the mount section from being a cause for excessive or short amount of the lubricant injected inside the bearing, thus preventing the lubricant from diffusion while minimizing the amount of the lubricant for hydrodynamic pressure that overflows from the junction surface between the rotation shaft and the thrust plate. Therefore, according to this invention, the amount of lubricant inside the hydrodynamic bearing is maintained constant and the bearing surface is prevented from burning out due to lubricant shortage. When applied to various types of motors such as a spindle motor, it provides a bearing apparatus of excellent properties such as smooth driving of the motor.

Also, this invention is configured in that an adhesive for sealing the bearing component constituting the bearing space is guided well to the entire periphery in the junction surface by capillary force, to prevent the lubricant in the junction from diffusing to the outside. Therefore, it provides a simple structure with low cost, excellently preventing lubricant leakage and prolonging its usable lifetime. Also, the application of the hydrodynamic bearing apparatus may be extended.

While the foregoing description and drawings represent the preferred embodiments of the present invention, it will be obvious to those skilled in the art that various changes and modifications may be made therein without departing from the true spirit and scope of the present invention.

What is claimed is:

1. A hydrodynamic bearing apparatus comprising:
    at least two hydrodynamic bearing units which rotatably support a rotation member against a fixed member by hydrodynamic pressure of a lubricant filled in a bearing space;
    a thrust plate being adhesively bonded on one of said rotation member and fixed member to support said rotation member in an axial direction, said thrust plate and rotation member or fixed member forming a junction;
    mechanical bonding means bonding said thrust plate onto one of said rotation member and fixed member; and
    a sealing agent for preventing said lubricant from leaking from said junction between said thrust plate and said rotation member or fixed member being provided to fill a space that communicates with said junction.

2. The hydrodynamic bearing apparatus according to claim 1, wherein said mechanical bonding means is provided by screws to fix said thrust plate onto said rotation member or fixed member.

3. The hydrodynamic bearing apparatus according to claim 2, wherein said sealing agent is formed of adhesive which enters said junction between said thrust plate and said rotation member or fixed member by capillary action.

4. In a hydrodynamic bearing apparatus for rotatably supporting a rotation shaft with a predetermined dynamic pressure of a lubricant and having a thrust plate for supporting said rotation shaft in the axial direction being adhered on a mount surface on a frame side, an improvement comprising:
    mechanical bonding means for adhering a junction between said thrust plate and said mount surface on the frame side; and
    a sealing agent being filled between said thrust plate and the mount surface on the frame side to prevent said lubricant from leaking from the junction therebetween, said sealing agent being filled in a space that communicates with said junction.

5. The hydrodynamic bearing apparatus according to claim 4, wherein said mechanical bonding means includes screws for adhering the thrust plate onto the frame by way of screw holes in the thrust plate, and a part of the dimensions for at least one screw hole formed in said thrust plate being larger than that of a screw head.

6. The hydrodynamic bearing apparatus according to claim 5, wherein said screw hole formed on said thrust plate being formed by notching an outer circle edge of the thrust plate in a U-shape.

7. The hydrodynamic bearing apparatus according to claim 4, wherein said thrust plate and frame are attached one to another so that the adhesive enters the junction by capillary action.

8. The hydrodynamic bearing apparatus according to claim 4, wherein said mount surface on the frame side is formed so as to be enclosed by a wall formed in the frame; said thrust plate being formed of a size so that it does not contact said wall; said adhesive being filled between an outermost peripheral end of said thrust plate and the wall formed on the frame.

* * * * *